US008433809B2

(12) United States Patent
Dor et al.

(10) Patent No.: US 8,433,809 B2
(45) Date of Patent: Apr. 30, 2013

(54) METHOD AND SYSTEM FOR PROVIDING A SESSION INVOLVING A PLURALITY OF SOFTWARE APPLICATIONS

(75) Inventors: Pierre Dor, Vence (FR); Dietmar Fauser, Grasse (FR); Jérôme Daniel, Grasse (FR); Stéphane Monbel, Nice (FR); Cyril Deguet, Golfe Juan (FR)

(73) Assignee: Amadeus S.A.S., Sophia Antipolis (FR)

( * ) Notice: Subject to any disclaimer, the term of this patent is extended or adjusted under 35 U.S.C. 154(b) by 54 days.

(21) Appl. No.: 13/065,312

(22) Filed: Mar. 18, 2011

(65) Prior Publication Data
US 2012/0239728 A1  Sep. 20, 2012

(30) Foreign Application Priority Data
Mar. 15, 2011 (EP) .................................... 11305281

(51) Int. Cl.
  *G06F 15/16* (2006.01)
(52) U.S. Cl.
  USPC ........... 709/228; 709/227; 709/229; 709/240; 709/242
(58) Field of Classification Search .................. 709/228, 709/227, 229, 240, 242, 224; 433/29; 713/201; 725/51; 726/4
  See application file for complete search history.

(56) References Cited

U.S. PATENT DOCUMENTS

| | | | |
|---|---|---|---|
| 5,495,606 A | 2/1996 | Borden et al. | |
| 5,822,747 A | 10/1998 | Graefe et al. | |
| 6,392,997 B1 | 5/2002 | Chen | |
| 7,437,408 B2 | 10/2008 | Schwartz et al. | 709/204 |
| 7,454,462 B2 | 11/2008 | Belfiore et al. | 709/203 |
| 7,454,761 B1 | 11/2008 | Roberts et al. | 719/318 |
| 7,512,652 B1 | 3/2009 | Appelman et al. | 709/204 |
| 7,778,962 B2 | 8/2010 | Shah et al. | |

(Continued)

FOREIGN PATENT DOCUMENTS

| CN | 101187946 A | 5/2008 |
|---|---|---|
| EP | 2259217 A1 | 12/2010 |

(Continued)

OTHER PUBLICATIONS

IBM, "WebSphere Edge Server for Multiplatforms, Getting Started", Version 2.0, (Dec. 2001), (119 pages).

(Continued)

*Primary Examiner* — Le H Luu
(74) *Attorney, Agent, or Firm* — Wood, Herron & Evans, LLP

(57) ABSTRACT

A computer-implemented method for providing a user with a consistent view of user session. The method includes providing application servers with data storage means for storing part of the user context for that user session, defining for each user session a set of application servers having each an affinity with the user session. At a routing means, receiving a request and routing transactions of the user session toward the application servers, assigning to the user session a correlation record (DCX) arranged to comprise Affinity Keys, each Affinity Key indicating an application server that has an affinity with the user session for a given software application, and propagating the correlation record with transactions, allowing thereby the routing means to target the application servers that are linked to the user context of that user session and that process the software application relevant to process the transaction.

29 Claims, 5 Drawing Sheets

U.S. PATENT DOCUMENTS

| | | | |
|---|---|---|---|
| 7,890,461 B2 | 2/2011 | Oeda et al. | |
| 7,925,624 B2 | 4/2011 | Vosshall et al. | |
| 2002/0078150 A1 | 6/2002 | Thompson et al. | 709/204 |
| 2002/0143933 A1* | 10/2002 | Hind et al. | 709/224 |
| 2003/0004760 A1 | 1/2003 | Schiff et al. | |
| 2003/0023715 A1 | 1/2003 | Reiner et al. | 709/224 |
| 2003/0195959 A1 | 10/2003 | Labadie et al. | 709/224 |
| 2003/0200194 A1 | 10/2003 | Arnold et al. | |
| 2003/0225888 A1 | 12/2003 | Wason | 709/227 |
| 2003/0233473 A1 | 12/2003 | Bonhomme et al. | |
| 2004/0006625 A1* | 1/2004 | Saha et al. | 709/227 |
| 2004/0006711 A1* | 1/2004 | Krishnaswamy et al. | 713/201 |
| 2004/0267623 A1 | 12/2004 | Vivadelli et al. | |
| 2005/0008163 A1 | 1/2005 | Leser et al. | 380/281 |
| 2005/0026103 A1* | 2/2005 | Wasylucha | 433/29 |
| 2005/0108069 A1 | 5/2005 | Shiran et al. | |
| 2005/0108298 A1 | 5/2005 | Iyengar et al. | |
| 2005/0262100 A1 | 11/2005 | Piper | 707/10 |
| 2006/0155857 A1 | 7/2006 | Feenen, Jr. et al. | 709/227 |
| 2006/0212583 A1 | 9/2006 | Beadle et al. | 709/227 |
| 2007/0110010 A1 | 5/2007 | Kotola et al. | 370/338 |
| 2007/0192492 A1 | 8/2007 | Okazaki | 709/226 |
| 2007/0234417 A1 | 10/2007 | Blakley, III et al. | 726/12 |
| 2008/0028084 A1 | 1/2008 | Bloching et al. | 709/229 |
| 2008/0091480 A1 | 4/2008 | Geoghegan et al. | 705/5 |
| 2008/0126567 A1 | 5/2008 | Wilson | |
| 2008/0167906 A1 | 7/2008 | De Marcken | |
| 2008/0262878 A1 | 10/2008 | Webby et al. | |
| 2008/0288644 A1 | 11/2008 | Gilfix et al. | |
| 2009/0019118 A1 | 1/2009 | Jones et al. | 706/206 |
| 2009/0234682 A1 | 9/2009 | Baggett et al. | |
| 2009/0320073 A1* | 12/2009 | Reisman | 725/51 |
| 2010/0064349 A1* | 3/2010 | Randle et al. | 726/4 |
| 2010/0220604 A1 | 9/2010 | Skog et al. | 370/252 |
| 2011/0029336 A1 | 2/2011 | Vieillard-Baron et al. | |
| 2011/0082942 A1 | 4/2011 | Takei et al. | 709/227 |
| 2011/0149951 A1 | 6/2011 | Qiu et al. | 370/352 |
| 2012/0131212 A1 | 5/2012 | Tang et al. | 709/228 |
| 2012/0239620 A1 | 9/2012 | Masini et al. | |
| 2012/0239724 A1 | 9/2012 | Masini et al. | |
| 2012/0239818 A1 | 9/2012 | Defayet et al. | |
| 2012/0284062 A1 | 11/2012 | Aubry et al. | |

FOREIGN PATENT DOCUMENTS

| | | |
|---|---|---|
| KR | 1020050006383 A | 1/2005 |
| WO | 9832064 A2 | 7/1998 |
| WO | WO 99/60478 | 11/1999 |
| WO | 0063808 A1 | 10/2000 |
| WO | WO 02/19105 A1 | 3/2002 |
| WO | WO 02/29640 A1 | 4/2002 |
| WO | 2008086146 A2 | 7/2008 |

OTHER PUBLICATIONS

IBM, "WebSphere Application Server V6 Scalability and Performance Handbook", (May 2005), (1118 pages).

European Search Report for European Patent Application No. 11305518 dated Sep. 15, 2011.

Commonly assigned co-pending U.S. Appl. No. 13/185,417 filed Jul. 18, 2011.

European Search Report for European application No. 11305278 dated Jul. 5, 2011.

Screenshot of Kayak's home page, http://www.kayak.com/news/kayak-adds-map-based-search-tool-to-popular-ipad-app.bd.html, p. 1 (copyright 2011).

Screenshot of Odopo's home page, http://promos.odopo.co.uk/airtools/escape?map.html, pp. 1-2 (Copyright 2011).

Screenshot of Lufthansa's Trip Finder home page, http://www.lufthansa.com/online/portal/lh/us/nonav/local?nodeid=3322431&l=en, p. 1 (downloaded from the internet Jul. 18, 2011).

Screenshot of TravelTainment's home page, http://www.traveltainment.fr/a-propos-de-traveltainment/quisommesnous/, p. 1 (copyright 2010).

European Search Report for European Application No. 11 30 5280 dated Oct. 20, 2011.

European Search Report for European Application No. 11 30 5281 dated Aug. 12, 2011.

European Search Report for European Application No. 11 30 5277 dated Aug. 10, 2011.

Keen et al., "Patterns: SOA Foundation—Business Process Management Scenario", Sections 2.2, 2.3, 5.1-5.3, 7.1-7.4, ibm.com/redbooks, pp. 1-523 (Aug. 1, 2006).

Sadtler et al., "Patterns: Broker Interactions for Intra- and Inter-enterprise," Sections 3.3-3.5, 4.1-4.3, 5.1-5.3, 6.1-6.3, 9.1-9.6, ibm.com/redbooks, pp. 1-303 (Jan. 1, 2004).

Soheila Davanlou, Examiner, USPTO, Office Action issued in related U.S. Appl. No. 13/084,512 dated Sep. 7, 2012.

European Search Report for European Application No. 11 30 5813 dated Nov. 10, 2011.

Allen J. Jung, Examiner, USPTO, Office Action issued in related U.S. Appl. No. 13/185,417 dated Nov. 6, 2012.

European Patent Office, extended European search report issued in related European application No. 11305280.7 dated Jan. 17, 2012.

* cited by examiner

METHOD AND SYSTEM FOR PROVIDING A SESSION INVOLVING A PLURALITY OF SOFTWARE APPLICATIONS

TECHNICAL FIELD

The present invention relates generally to methods and systems that provide a user of software applications with a consistent view of each open session in a distributed computing environment. More particularly, the invention relates to methods and systems wherein a very high number of user sessions are possibly opened simultaneously and wherein each user session may require the cooperation of various software applications to complete.

BACKGROUND

As the number of people using e-services in their every day life grows everyday, systems providing these e-services are required to process an always increasing number of user sessions. In addition, users are now expecting that information and services delivered to be more and more efficient and sophisticated. Then, to achieve this goal, the transactions for each user session often need to be processed by distinct software applications.

For instance, in the travel and tourism industry, a reservation system has to process tenths of thousands of user sessions opened at the same time and that request checking availability of flights. Information provided by the user to such a user session typically includes the date of departure, the origin and destination of the flights. They form part of the user context for that session which also comprises data gathered from the various transactions processed by the session such as availability information, prices, flight references etc.

In order to maintain a sufficient throughput, some solutions are based on centralized computing systems having a single very powerful processing unit. These centralized systems are however hardly scalable both in term of deployment of new additional applications and in term of increasing of processing capabilities. In addition, these systems are not reliable as a failure of the centralized processing unit may lead to a general outage.

Other solutions rely on distributed systems wherein the total processing capability is spread over a large number of distributed machines. In these existing distributed systems all transactions dedicated to a given user session are still managed by a single machine though.

Scalability is then simply achieved by increasing the number of machines so that the overall processing capability of the system can be easily adapted to fulfill the throughput needs.

However, with these distributed systems, it remains difficult to manage the integration of new services, especially when they are based on new software applications intended to interact with the software applications already loaded while always maintaining consistency from the user side.

Hence, to be able to maintain a consistent and unified view from the user side, the new software applications must be loaded on every single machine. On top of being a time consuming operation this does not however allow consistency between all users to be actually achieved until loading step has completed over the entire distributed system.

Therefore, a general objective of the invention is to describe a method and a system capable of providing a user with a unified view of a session, while allowing scalability of processing capability and while easing the integration of new services.

SUMMARY

The foregoing and other objectives are fulfilled at least partially, and other advantages are realized, in accordance with the embodiments of this invention.

The invention relates to a method of providing a user with a user unified view of a computerized user session, wherein the user session requires the operation of a plurality of software applications processed by a system, the system operating with the user in a client/server mode, a plurality of software applications being each linked to at least a part of a user context related to the user session, characterized in that it comprises the following steps performed with at least one processor:

for each user session, each software application that is linked to at least a part of a user context is processed by a dedicated application server among a group of application servers processing each independently that software application, defining thereby for each session a set of application servers having each an affinity with the user session, providing each application server having an affinity with the user session with data storage means configured to store the part of the user context linked to the application software that is processed by said each application server, at one or more routing means, one among the one or more routing means being a main routing means in charge of the user session: receiving at least a request from the user and routing transactions of the user session toward at least the application servers having an affinity with the user session in order to fulfill the request, the step of routing transactions comprising:

assigning to the user session a correlation record (DCX) arranged to comprise Affinity Keys, each Affinity Key indicating an application server that has an affinity with the user session for a given software application, propagating the correlation record with each transaction, allowing thereby the routing means to read the correlation record and to target the application servers that have an affinity with the user session and that process the software applications relevant to process the transaction.

Another aspect of the present invention relates to a method of providing a user with a user session, wherein the user session requires the operation of a plurality of software applications processed by a system operating with the user in a client/server mode, at least one of the software applications being linked to at least a part of a user context related to the user session, characterized in that for each user session, each software application is processed by one application server among a group of application servers that each processes independently said each software application, in that each application server that processes a software application linked to a part of the user context is thereby linked to the user context i.e. has an affinity with the session and is provided with data storage means configured to store the part of the user context to which it is linked. The method comprises a step, performed with at least one processor, of assigning to the user session a correlation record (DCX) configured to comprise Affinity Keys, each Affinity Key indicating the application server that must be targeted for a given software application and for said user session. The method also comprises the following steps that are performed at one among one or more routing means through a processor, one routing means being a main routing means in charge of the user session: receiving a transaction; determining a software application that is called by the transaction, determining if the transaction requires to be routed to an application server linked to the user context:

if the transaction requires to be routed to an application server linked to the user context then:

if the correlation record contains any Affinity Key for the called software application, then routing the transaction according to the Affinity Key;

if the correlation record does not contain an Affinity Key for the called software application, one of the routing means selects an application server among the group of application servers that process the called software application, enriches the correlation record with an Affinity Key indicating the selected application server, routes the transaction to the selected application server and the main routing means stores the correlation record.

Optionally and preferably, if the transaction does not require to be routed to an application server linked to the user context, then the routing means selects an application server among the group of application servers that process the called software application, and routes the transaction to the selected application server.

Optionally and preferably, the step of receiving a transaction comprises receiving a transaction from the user. Optionally, the step of receiving a transaction comprises receiving a transaction from a software application.

Another aspect of the invention relates to a non-transitory computer-readable medium that contains software program instructions, where execution of the software program instructions by at least one data processor results in performance of operations that comprise execution of the method as in any one of the preceding claims.

According to another aspect, the invention relates to a system comprising means configured to execute the method as in any one of the preceding features and steps.

Another aspect of the present invention relates to a system for providing a user with a user session, comprising a plurality of software applications, the operation of which being required for providing the user session, at least one of the software applications being linked to at least a part of a user context related to the user session, characterized in that it comprises:

a plurality of machines comprising each at least a processor, a plurality of application servers running each on a machine, each application server being arranged so that for that user session each software application is processed by one application server among a group of application servers dedicated to that software application, defining thereby for each user session a set of application servers having each an affinity with the user session, data storage means associated to each application server that processes a software application linked to a part of the user context, each storage means being arranged to store the part of the user context that is linked to the software application that is processed by the application server associated to said storage means, one or more routing means, among which a main routing means is arranged to be in charge of the user session, the one or more routing means being configured to: receive at least a request from the user and route transactions of the user session toward the application servers having an affinity with the user session in order to fulfill the request, the routing means being configured so that the transaction step comprises:

assigning to the user session a correlation record (DCX) arranged to comprise Affinity Keys, each Affinity Key indicating an application server that has an affinity with the user session for a given software application, propagating the correlation record with each transaction, allowing thereby the routing means to read the correlation record for targeting the application servers that have an affinity with the user session and that process the software applications relevant to handle the transaction.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

Figure 1:
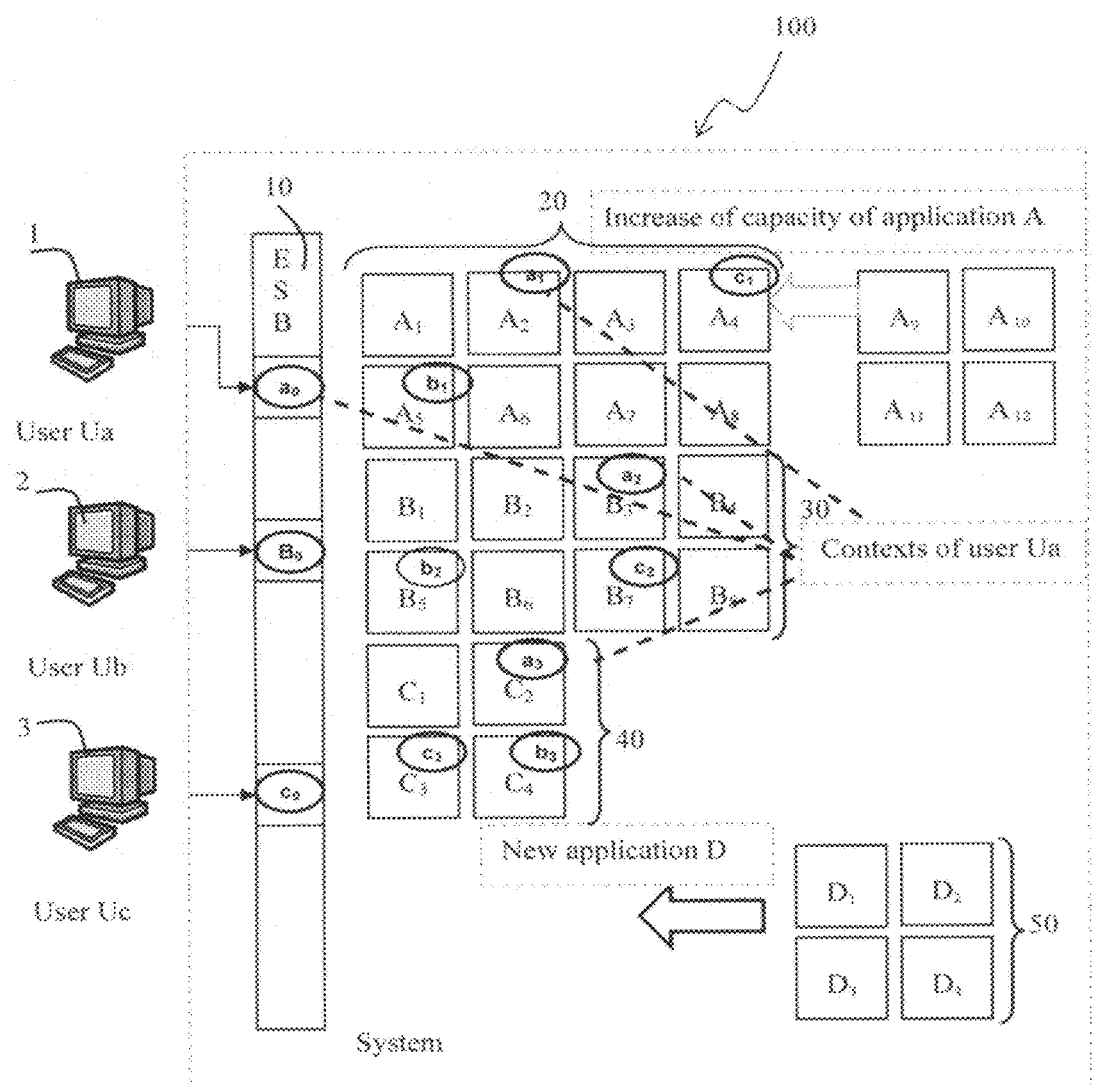
FIG. 1 shows an example of a system according to an embodiment of the invention.

Some advantageous features and steps will be described below. Then some exemplary embodiments and use cases will be further detailed in regard with the drawings.

As indicated above, the invention relates to a method of providing a user with a user unified view of a computerized user session, wherein the user session requires the operation of a plurality of software applications processed by a system, the system operating with the user in a client/server mode, a plurality of software applications being each linked to at least a part of a user context related to the user session. The method comprises the following steps performed with at least one processor:

for each user session, each software application that is linked to at least a part of a user context is processed by a dedicated application server among a group of application servers processing each independently that software application, defining thereby for each session a set of application servers having each an affinity with the user session, providing each application server having an affinity with the user session with data storage means configured to store the part of the user context linked to the application software that is processed by said each application server, at one or more routing means, one among the one or more routing means being a main routing means in charge of the user session: receiving at least a request from the user and routing transactions of the user session toward at least the application servers having an affinity with the user session in order to fulfill the request, the step of routing transactions comprising:

assigning to the user session a correlation record (DCX) arranged to comprise Affinity Keys, each Affinity Key indicating an application server that has an affinity with the user session for a given software application, propagating the correlation record with each transaction, allowing thereby the routing means to read the correlation record and to target the application servers that have an affinity with the user session and that process the software applications relevant to process the transaction.

Thus, each group of services is processed on an independent set of application servers, each application server being possibly run by an independent machine, each part of the user context related to a group of services is stored locally on one of the application servers in charge of that group of services and each user interacts with the system as if it was only one application server. The DCX is added on each transaction coming into the system to correlate the parts of the user context that are spread through a possibly high number of servers. The Affinity Key is specific information to identify which application server (and machine) is holding a part of the user context for a given set of services. Then the Affinity Key is used by the ESBs to route the transactions to the specific application server managing the context of a user.

Therefore the invention discloses a solution to provide a user with a consistent and unified view of a user context, keeping modularity of the system to ease the increase of processing capacity and allowing easy integration of new services/products.

The invention also provides significant advantages in term of operability as it allows an easier control of the resources allocated to each sub part of a global product comprising various software applications. It also permits to minimize the risk of global outage since an outage on a given machine or set of machines does not impact significantly the other machines.

All application servers are independent of each other. They do not know each other. Only the correlation record that is read by the routing means allows establishing a conversation between two application servers processing different software applications. Thus, the Affinity Key is a reference added to the correlation record and that allows the routing means to target the application server that holds the part of the user context linked to the user session and that is relevant to process the transaction.

Optionally, the invention may comprise at least one of the following non limitative features and steps:

The one or more routing means is configured to know how to reach every single application servers.

Thus, the one or more routing means knows the presence of each application server and where each application server is located. The one or more routing means also knows on which application servers a given software application is processed.

Preferably, the correlation record is stored in data storage means associated to the main routing means.

The main routing means is the routing means that receives the user request. The Affinity Keys are set by the routing means.

The routing means is an enterprise service bus (ESB).

A routing means receives a transaction from an application server processing a software application and the correlation record assigned to the session and routes the transaction to another application server dedicated to process another software application. The step of routing the transaction comprises a step wherein the routing means reads the correlation record.

Upon reception of the correlation record at said routing means, if the correlation record does not contain the Affinity Key indicating said other application server where the transaction must be routed to, then the step wherein said routing means routes the transaction to another application server comprises the additional following step: the routing means determines if a life duration of the part of the user context linked to said other software application must be linked to the life duration of the session.

Upon reception of the correlation record at said routing means, if the correlation record does not contain the Affinity Key indicating said other application server where the transaction must be routed to and if a life duration of the part of the user context linked to said other software application must be linked to a life duration of the user session, then the step wherein said routing means routes the transaction to another application server comprises the additional following step:

said routing means sends to the main routing means a request for affinity initialization,
then the main routing means:
selects said other application server among the group of application servers that processes said other software application,
sends to said other application server a message of affinity initialization,
receives from said other application a confirmation of affinity initialization,
enriches the correlation record with an Affinity Key indicating said other application server,
sends the correlation record as enriched to said routing means,
then said routing means routes the transaction to said other application server according to the Affinity Key of the correlation record as enriched.

Upon reception of the correlation record at said routing means, if the correlation record does not contain the Affinity Key indicating said other application server where the transaction must be routed to and if the life duration of the part of the user context linked to said other software application does not have to be linked to the life duration of the session, then the step wherein the routing means routes the transaction to said other application server comprises the additional following step: said routing means selects said other application server among the group of application servers that processes said other software application that must be processed to fulfill the transaction and routes the transaction to said other application server.

Preferably, the correlation record is enriched with the Affinity Key indicating said other application server.

The correlation record is enriched by said routing means and the correlation record is returned via the reply path to the main routing means and stored in data storage means associated to the main routing means. The routing means that enriches the correlation record and the main routing means are is distinct. According to an alternative embodiment, the routing means that enriches the correlation record and the main routing means are the same.

Upon reception of the correlation record at said routing means, if the correlation record already contains the Affinity Key indicating said other application server where the transaction must be routed to, then said routing means routes the transaction according to the Affinity Key to said application server.

An application server receives a transaction from a routing means, generates a part of the user context through processing the transaction and stores the part of the user context in data storage means provided with said application server.

The application server enriches the correlation record with an Applicative Context Key which allows retrieving from said application server said part of the user context.

Thus, the Applicative Context Key is a reference that indicates where said part of the user context linked to the software application is located on said application server.

The correlation record as enriched with the Applicative Context Key is sent back via the reply path to the main routing means and is stored in data storage means associated to the main routing means.

Upon reception at said application server of a further transaction related to said user session, said application server locates said part of the user context in said storage means based on the Applicative Context Key. Said part of the user context can then be further retrieved and processed. This allows an easy retrieval of all parts of the user context wherever they are located.

The correlation record is propagated with each transaction. The correlation record is enriched by the routing means with Affinity Keys to allow the routing means to target the application servers that hold the part of the context of the user session. The correlation record is also enriched by the application servers with Applicative Context Keys to allow each application server to retrieve the part of the user context that is stored in its storage means. Each time the correlation record is enriched with a new Affinity Key or with a new Applicative Context Key, the correlation record is returned to the main routing means.

If a life duration of a part of the user context linked to a software application must be linked to a life duration of the user session, then a stateful conversation is open between the main routing means and the application server processing said software application as long as the user session is active, the stateful conversation being automatically closed upon ending of the user session.

Advantageously, as long as the user session is active, the main routing means regularly indicates to said application server that said part of the user context must be kept stored.

The main routing means indicates to said application server that said part of the user context linked to said other software application can be deleted.

The part of the user context linked to a software application may be generated by the user and/or by the software application linked to the application server comprising data storage means that stores said part of user context. The part of user context linked to a software application may also be required or generated by that software application.

Each data storage means of a given application server is distinct from the data storage means of the other application servers.

The application servers run on machines comprising processor and data storage means. According to an embodiment, at least a plurality of application servers runs on a same machine. According to another embodiment one single application server runs on per machine.

Typically, the session allows at least one of: checking the availability of a travel product, booking a travel product or paying a travel product. For instance, the part of the user context may relate to a travel product availability. Typically, the travel product is a ticket for a flight, railway or boat transportation. The part of the user context may also relate to a travel a passenger name record (PNR).

In the context of the invention, a user session can be considered as a session wherein a user is provided with at least a service, a service requiring one or more software applications to be processed.

For instance, during a user session the user accesses a service related to train ticket availability information and to a service related to flight ticket availability information. Each of these services require the operation of software applications such as for instance: a software application for receiving inputs from the user regarding a departure date and/or an origin and/or a destination; a software application for transforming the protocol of a user request into another protocol; a software application for retrieving availability data regarding train from an railway inventory database, a software application for retrieving availability from an airline inventory database etc.

As illustrated on FIG. 1, the system comprises at least a routing means that receives a request from a user. Preferably, the routing means is an enterprise service bus. Alternatively, the routing means can also be a router or any other means able to route a transaction to an appropriate application server. In the following, the routing means will be referred to as ESBS. Whatever is their nature: enterprise service bus, router etc.

For each user session, one ESB is in charge of the session. This ESB is referred to as the main ESB. Preferably, the main ESB is the ESB that receives the request from the user.

Preferably, the system comprises a plurality of machines. Each machine is a hardware device that comprises at least a processing means running at least an application server. At least some of the machines also comprise data storage means. At least an application server runs on a machine. The application server uses the processing means. At least some of the application servers also use the data storage means. Thus an application server is linked to processing means and eventually to data storage means.

According to a particular embodiment, a plurality of application servers runs on a single machine. Each application server may use its own processor means and eventually its own eventual data storage means. Alternatively, a plurality of application servers may share the same processor and eventually the same data storage means.

According to another embodiment, only one application server runs for a given machine. Thus, according to this other embodiment, routing a transaction to a machine will also mean routing a transaction to an application server in the description below.

Each application server processes a software application.

Advantageously, the same software application is independently processed by a plurality of application servers, these application servers running on the same machine or on different machines.

The system can also be referred to as a platform.

Application servers are organized into groups 20, 30, 40, 50.

All application servers of the same group of application servers process the same software application. For instance, each application server A1, A2, . . . , A12 of group 20 processes the software application A. Each application server B1, B2, . . . , B8 of group 30 processes the software application B. Each application server C1, C2, C3 of group 40, processes the software application C.

For a given session there is only one application server that operates per software application. Thus, among a group of application servers processing the same software application, one application server is dedicated to that given session.

As indicated above, each application server that needs to store data is provided with data storage means. The application server dedicated to a session stores in its storage means the part of the user context that is relevant for the software application that is processed by that dedicated application server.

In the present invention, the user context also referred to as context is a context related to a user and relevant to process a session. It represents all the functional and technical information that are used by the system for this specific user to perform the requested functionalities, e.g. in the travel reservation system, the reservation (shopping) session context which is linked to an active end session. The part of the user context may be data provided by the user such as user personal references, a departure date, an origin or a destination. This part of the user context may be required by the software application linked to the storage means. The part of the user context may also be data generated by the software application. For instance, the part of the user context may relate to flight availability retrieved by the software application or to prices computed or retrieved by the software application. The part of the user context may also relate to a passenger name record (PNR) or a part of a PNR.

Thus, the context of the user is distributed over a possible very large number of application servers, each part of the user context being stored locally. As depicted on FIG. 1, the context of user Ua comprises the parts a0, a1, a2, a3 and is distributed through the application servers A2, B3, C2. The context of user Ub comprises the parts b0, b1, b2, b3 and is distributed through the application servers A5, B5, C4. More precisely, the part a1 of the context of the user Ua is stored in the data storage means of the application server A2; the part a2 of the context of the user Ua is stored in the data storage means of the application server B3; the part c3 of the context of the user Uc is stored in the data storage means of the application server C3 etc.

Therefore, all application servers that are dedicated to a given user session form a set of application servers having each an affinity with that session.

For processing a session and to provide the user with a unified view of the session, the system has to target all application servers having an affinity with that session.

Providing the user with a unified view of the session means that the user does not notice that the various software applications are processed by various and independent application servers. Thus, the number of software applications and the application servers involved in the session is transparent to the user. The user interacts with the system as if it is one unique application server and machine.

The solution for targeting the relevant application servers is detailed below with reference to FIGS. 2 to 5.

FIG. 1 clearly illustrates that additional application server can be added to the system, increasing thereby the processing capability of the entire system. For instance, the application servers A9, A10, A11, A12 are added to the group 20 comprising the application servers A1, A2, . . . , A8. Thus, more transactions can be processed by group 20 and a higher number of sessions can be handled simultaneously without decreasing the processing time. Additionally, the integration of additional application servers is easy and is totally transparent to the user.

Advantageously, the invention also allows integrating to the system new services or new software applications. The group 50 of application servers D1, D2, D3, D4 illustrates the integration of application servers processing a new software application that does not process the previously integrated application servers. Thus, additional services can be offered to the all users without requiring loading the new software application on every single application server already integrated. Moreover, integrating a new software application in the system is quite simple as only the ESB(s) must know the presence of these new software application and application servers. More precisely, when integrating each new application server, the application server and the software application that runs on it are declared to the ESB(s). In case there are a plurality of ESBs, all ESBs know the topology of the system i.e., each ESB knows where to locate each application server and what is the software application that is processed on each application server.

In a particular embodiment, more than one application server runs on a single hardware machine. However, the ESBs know all application servers dedicated to each software application.

The groups of application servers already in the system do not have to know that additional application servers or additional software applications are integrated. Thus, integrating additional processing capacity or additional services does not impact the rest of the system and is transparent to the use.

Thanks to the invention, having the new software application available for all users at the same time is also easy and is not time consuming.

In the illustrated use case, every application server holds a part of the user context. In some embodiments, an application server does not store a part of the user context. For instance, such application server is in charge of retrieving some static data such as HTML resources in charge if propagating sell transactions to external providers.

Affinity Keys

The solution for providing a user with a unified view of the user session will be now explained with further details.

During a session, a user enters the system through the same ESB. Preferably, the ESB that forms the entry point is the main ESB and is in charge of the session until the end of that session.

For each transaction coming into the system, the main ESB creates a record referred to as the Distributed Context Correlator (DCX).

The DCX is dedicated to a unique user session. It is stored at the main ESB. The DCX comprises references. A reference identifies which application server is holding the user context for a given software application or set of software application. This reference is referred to as the Affinity Key. As each ESB knows the topology of the system, by reading the Affinity Keys of the DCX, the ESB is able to target the application server having an affinity with the session i.e. the application server using data storage means that stores the part of the user context. Thus, the entire context of the user can be accessed, even if it is spread through a high number of independent machines.

The DCX is added to each transaction. It is cascaded to all transactions between two application servers. When an application server calls another application server, the DCX is transmitted to that other application server. Such transactions wherein an application server calls another application server are referred to as collateral calls or collateral transactions.

Preferably, each application server that receives the DCX can enrich it with additional information that allows said application server to retrieve the part of the user context that is stored in its storage means. Thus, next time the application server will receive a transaction for that session; it will be able to easily retrieve the part of the user context for that session by simply reading that information of the DCX and wherever from which other application server the transaction is coming. In the present invention, this piece of information stored in the DCX is referred to as the Applicative Context Key.

Thus, the DCX comprises a reference of the session it is attached to, Affinity Keys for targeting application servers having an affinity with that session and Applicative Context Keys to allow each application server to retrieve its part of the user context.

Applicative Context Keys

The DCX also contains a unique identifier. According to a particular embodiment, this unique identifier can be used to reference the sub applicative contexts instead of using a specific reference. Thus this unique identifier can be used by the application server as an implicit applicative context key instead of creating and storing their own applicative context key. In such a case, the application context is indexed with the unique identifier in the storage means. Thus, the DCX contains less information while still allowing the application servers to retrieve their part of the user context.

Advantageously, the DCX is available on any transaction, independently of the communication protocol that is used in the transaction.

Therefore at any time when a software application is called, the ESB that receives a transaction determines if that transaction requires to be routed to an application server having an affinity with that session.

If an affinity is required, i.e., the transaction needs to be routed to an application server that holds a part of the user context associated to that software application, then the ESB has to target that application server. To this end, the ESB reads the Affinity Key of the DCX and identifies the relevant application server.

Then, said relevant application server receives the transaction and the DCX. Then, it can read the Application Context Key to retrieve the part of the user context that is required to process the transaction.

If no affinity is required by the transaction that reaches the ESB, said transaction does not need to be routed to a specific application server of the group of application servers that processes the called software application.

For instance, this occurs for a software application that generates its own part of the user context and when the application server processing said software application receives for the first time a transaction related to that session. Before that first transaction, no part of the user context has been created by said application server. A typical example relates to a use case wherein the application server aims at retrieving flights that are available for given parameters: date/origin/destination. Before receiving these parameters, the application server does not hold any context for that session. However after a first processing, said application server stores the retrieved flights in its dedicated storage means, creating thereby a part of the user context.

Then an affinity is created between that application server and the session. The application server enriches the DCX with an Affinity Key that will further allow every ESB to target it. Preferably, the application server also enriches the DCX with Applicative Context Key that will allow it to retrieve the available flights next time it receives a transaction for that session.

Once the DCX is enriched, it is sent back using the reply path to the main ESB where it is stored.

Another example wherein no affinity is required relates to software application that does not necessitate storing any data related to the session. For instance such a software application allows modifying the format of the message to suit another protocol. Once transformed, the message is then propagated but does not need to be stored at the application server that has performed the format transformation. Then, the DCX is not enriched with any Affinity Key for that software application.

When an ESB receives a transaction and determines that this transaction does not require affinity, the ESB decides the application server where to route the transaction. Typically, the ESB takes into account load balancing or proximity parameters.

The invention will be now explained with reference to FIG. 2 which depicts an exemplary use case.

Figure 2:
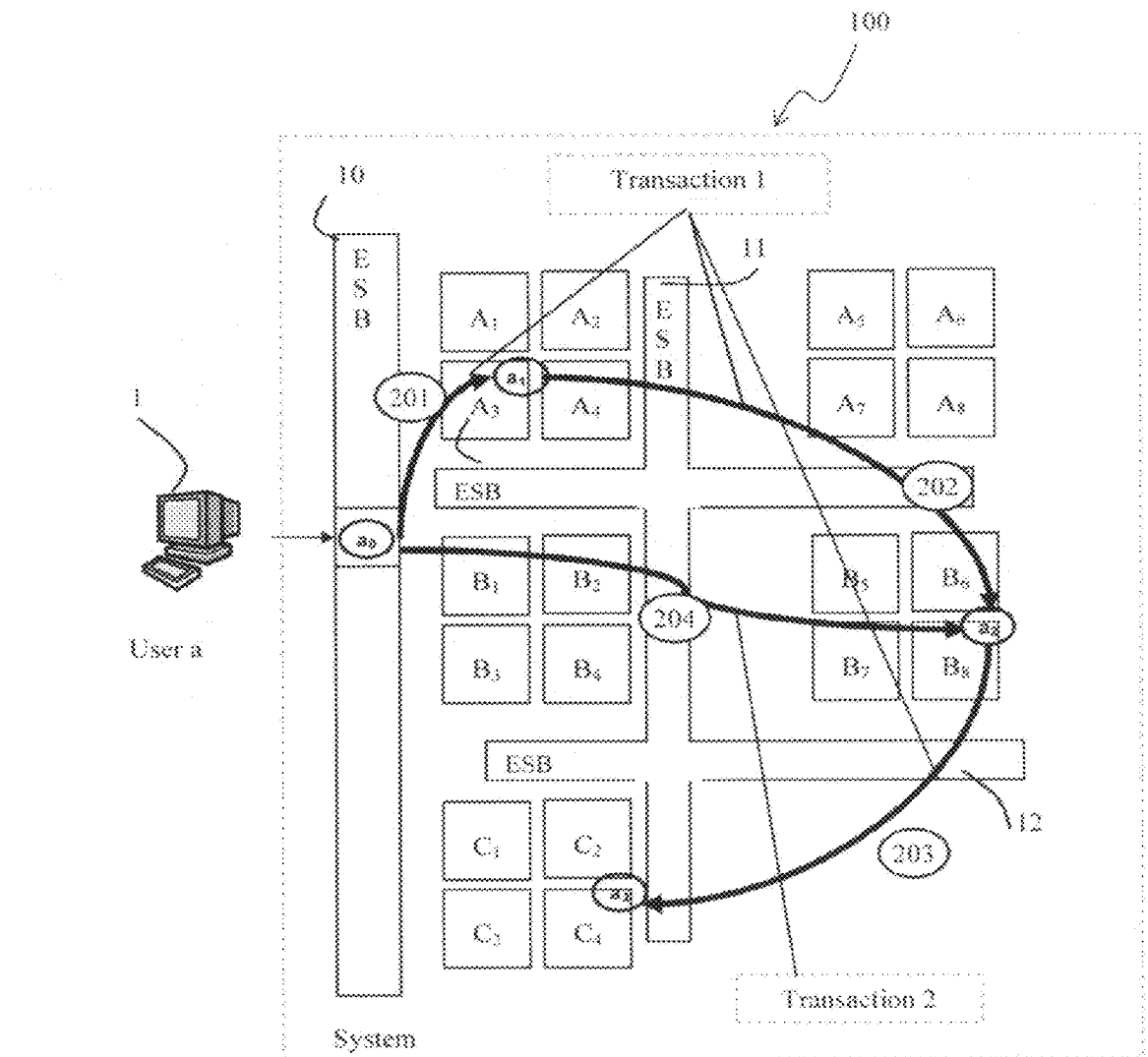
FIG. 2 shows an example of a system according to another embodiment of the invention. An exemplary use case is depicted.

For sake of clarity, only user Ua is represented on FIG. 2. At the beginning of the session, there is no user context. In this embodiment, the system comprises a plurality of ESBs 10, 11, 12. ESBs are configured so that a transaction reaches an ESB after each processing on an application server.

User Ua starts the session and enters the system through ESB 10, which is therefore the main ESB for that session. User Ua provides main ESB 10 with information forming the part $a_0$ of the user context. Main ESB 10 holds the part $a_0$ of the user context. Typically, $a_0$ comprises the DCX or is the DCX as stored in the main ESB. ESB 10 determines that the software application A is called. ESB 10 determines whether an affinity is requested. As affinity is requested at this stage and as the DCX does not contain any Affinity Key for software application A, then ESB selects any one of the application server of the group of application servers that processes software application A. In this example, application server A3 is chosen. Main ESB 10 sends the transaction (transaction 1) to application server A3 (step 201). Application server A3 processes the transaction, generates the part a1 of user context and stores $a_1$ in the data storage means of the machine where A3 runs. Main ESB also enriches the DCX with an Affinity Key that will allow any ESB to further target application server A3 when software application A will be called for that session. The request of affinity is part of the ESB configuration. Based on a transaction parameters, such as the source, the destination and the software application of the transaction reaching an ESB, that ESB, thanks to its configuration is able to determine whether the transaction must be processed taking into account an affinity. Thus, static information (configuration of the ESB) is taken into account in order to determine whether an affinity is requested while. The content of the DCX is dynamic information.

Preferably, application server A3 adds in the DCX the Application Context Key that will further allows application server A3 to easily retrieve part $a_1$ of the context next time it will receive a transaction for that session.

The DCX is then returned back to the main ESB 10 and is stored there. ESB 11 receives the transaction from application server A3 and determines that software application B is called by software application A (step 202). Such call is a collateral call or collateral transaction. As an affinity is requested for software application B but no affinity is stored in the DCX for application B, then ESB11 can select any one of the application servers of the group of application servers running software application B. ESB 11 selects application server B8, enriches the DCX with an affinity key corresponding to B8 and collateral transaction required to process transaction 1 reaches application server B8. Application server B8 processes the transaction and creates a part $a_2$ of the context for user Ua. Parts of the user context that are created through collateral calls are also referred to as sub-context.

The DCX is enriched with the Applicative Context Keys that relates to application server B8.

Similarly than for calls 201, 202 received by software application A and software application B, software application C is called without request for affinity (step 203). Application server C4 processing software application C is selected to process transaction 1. Application server C4 creates the part $a_3$ of the user context and stores it in its data storage means. The DCX is enriched with an Affinity Key that allows targeting application server C4 to retrieve the part $a_3$ of the user context. The DCX is returned back with the reply to the main ESB 10.

The main ESB 10 receives a new transaction from user Ua (transaction 2). Main ESB 10 determines that software application B is called to process that new transaction, and that an affinity is requested. Thus, the application server of group of service B that holds the part of the user context associated to that service must be targeted. Through reading the DCX, main ESB 10 reads the reference of the relevant application server of group of service B for that session and therefore targets application server B8.

Then main ESB 10 then routes the new transaction to application server B8 (step 204).

Then application server B8 will receive the new transaction will retrieve its part $a_3$ of the user context and will process the new transaction.

Therefore, through allowing the various servers and ESB to interact, the invention provides an efficient solution to provide a unified view of a session while its context is distributed and stored locally.

Context Life Duration of a Part of a User Context

Non limitative but particularly advantageous features of the invention will be now described. These features allow maintaining available during all the session some parts of the user context that could eventually be required for processing a transaction during that session. When the session ends, these parts of the context are removed.

Indeed, the user context is preferably valid only during the life duration of the session. Thus, the context of the session is not persistent, and upon ending of the session, the context is not stored any more and is removed.

For instance, all the parts of a user context used in the user context of a user session to manage a booking are kept until the end of the user session.

The Distributed Context Correlator (DCX) is available during the whole life duration of a user session. Any application server holding part of the user context can request to link the life duration of its context to the life duration of the user session.

User context and user session are linked in term of life duration by opening a stateful conversation between the ESB holding the DCX and the application server holding the user context.

The request for opening a stateful conversation is statically defined in the ESB configuration as part of the service called. More precisely, when an ESB receives a transaction, it analyses the parameters of the transaction such as its source, destination and the called software application. Then the ESB, thanks to its configuration is able to determine whether a stateful conversation must be opened. The same mechanism applies for determining whether a transaction must takes into account an affinity.

If an application server calls a service or software application processed on another application server requiring to have the life duration of its user context linked to the one of the DCX, the ESB that is in charge of routing the collateral transaction then calls the main ESB and asks the latter to open a stateful conversation with said other application server. Then the main ESB opens a stateful conversation with said other application server. The ESB in charge of routing the collateral transaction then routes the transaction to said other application server on which the stateful conversation has been opened with the main ESB.

A stateful conversation between the main ESB and a given application server has to be open prior to any transaction going to that given application server. This is for this reason that if a transaction has to be routed to a given application server by collateral traffic and before having a stateful conversation opened, the ESB routing the collateral transaction will request the main ESB to open the stateful conversation before routing the transaction to the application server. This functionality is referred to as auto-init of conversation.

Once such a stateful conversation is opened, the life duration of the DCX is linked to the one of the user context stored in the machine where the application server that is in stateful conversation with the main ESB runs. Said user context will be deleted only when the DCX will disappear.

Thanks to this solution, the invention allows maintaining all parts of the context that must be available during the session while limiting the data stored at the end of the session. Additionally, this solution limits the traffic and the volume of data transmitted between application servers.

According to a preferred embodiment, when a stateful conversation is open, the ESB regularly sends messages to the application server sharing its stateful conversation, said messages indicating that the user context must be maintained. These messages are referred to as "keep alive" messages. Thus, "keep alive" messages are sent from the main ESB to all application servers in stateful conversation with that main ESB. When the session ends, the DCX can be deleted and the main ESB sends to all application servers in stateful conversation a message indicating that the user context can be deleted. These messages are referred to as "terminate" messages.

There is only one stateful conversation from the main ESB owner of the DCX per application server or machine and user context. All the collateral transactions are using stateless conversations, even if the global transaction is stateful.

Figure 3:
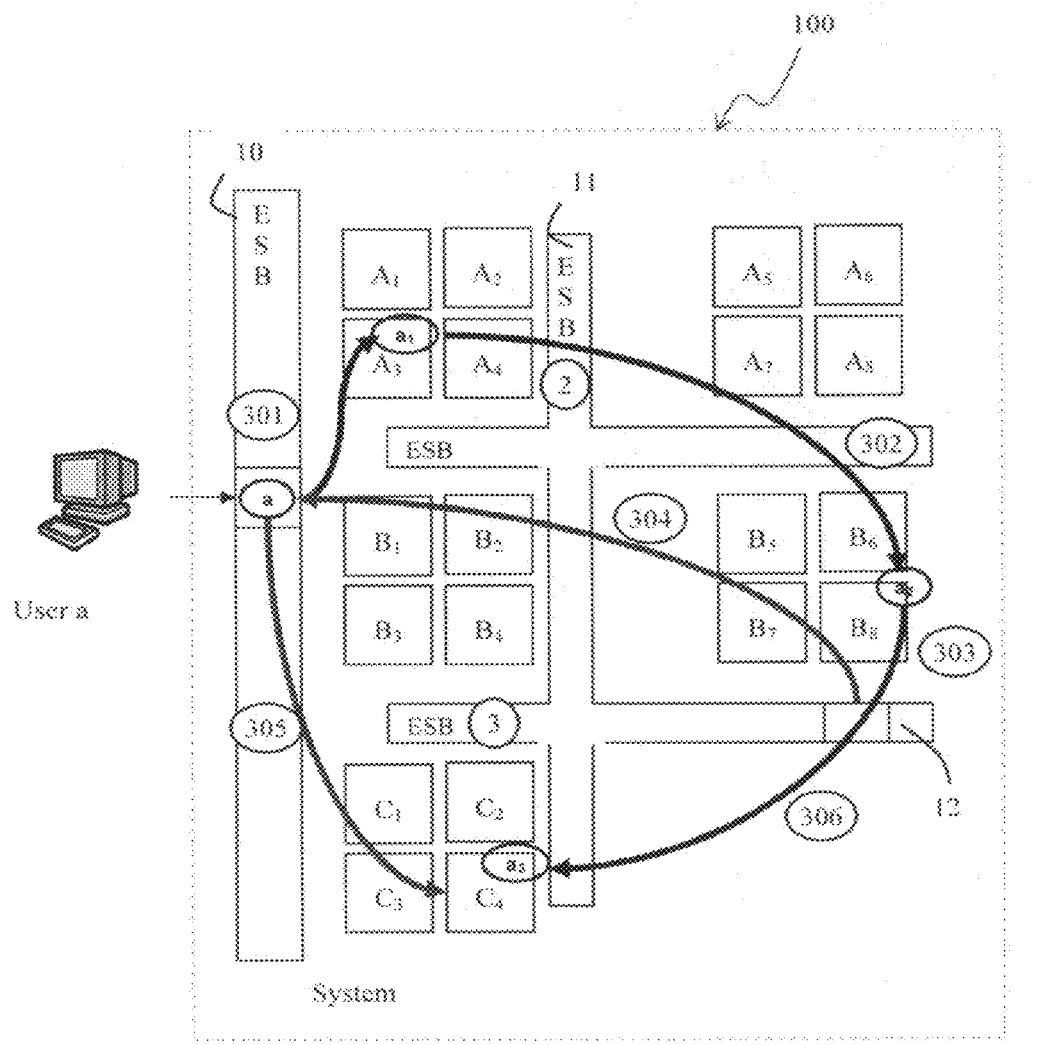
FIG. 3 shows the system of FIG. 2 and another exemplary use case illustrating the steps wherein the life duration of a part of the user context needs to be linked to the life duration of the user session.

FIG. 3 depicts a first example of transaction wherein a stateful conversation must be open.

User Ua sends a request to the system though main EBS 10. Steps 301 and 302 are similar to steps 201 and 202 of FIG. 2. When application server B8 has processed the transaction, ESB 12 receives the transaction (step 303) and is in charge of routing it. ESB 12 determines that the software application C that is called by software application B requires having the life duration of the part of its user context linked to the one of the session.

If no part of user context already exists for customer Ua on any application server of service group C, then ESB 12 in charge of routing the transaction to service group C calls main ESB 10 holding the DCX and requests it to open a stateful conversation with one application server of the service group C (step 304). Then, main ESB 10 opens a stateful conversation with one application server of the application servers of service group C (step 305). Then the DCX is enriched with the reference of the chosen application server C4. Then DCX is returned back to ESB 12 in charge of routing the collateral transaction. Then ESB 12 targets the application server C4 through reading the DCX and routes the transaction to application server C4 that is in stateful conversation with main ESB (step 306).

Figure 4:
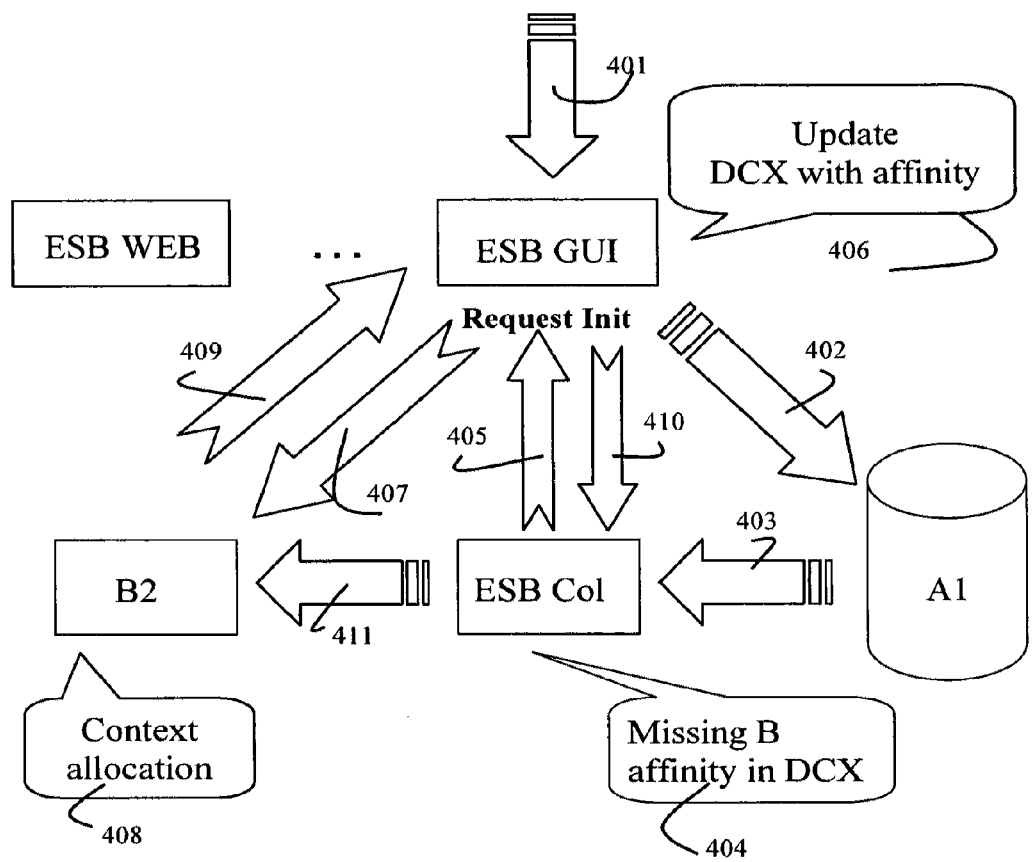
FIG. 4 is a simplified high level block diagram of some components of the system that illustrates the affinity initialization steps.

FIG. 4 depicts another example of transaction wherein a stateful conversation must be open.

Through a graphical user interface (GUI), the main ESB receives at step 401 a request from a user. For instance, that request is a creation of a passenger file. Its protocol is HTML. In order to be processed by the system, the request must be transformed into another protocol such as an EDIFACT protocol. Main ESB determines that for transforming the request, an application server of the group of application server processing software application A must be targeted. No affinity is required for such transformation. Then main ESB selects an application server of group of service A and routes the transaction to that application server (step 402). That application server is referred to as A1.

A1 processes the transaction by transforming the protocol. No data has to be stored by A1. Therefore, no part of the user context is created at A1. Conversation between main ESB and A1 is stateless.

Then, an ESB, referred to as collateral ESB (ESB Col) receives the transaction (step 403). Collateral ESB determines that the transaction must be routed to an application server that processes software application B. Collateral ESB also determines that an affinity is requested and that the life duration of the part of the context associated to the application server in charge of the next processing will have to be linked to the life duration of the session. Collateral ESB reads the DXC and determines that no affinity is set in the DCX for software application B (step 404). Then collateral ESB calls the main ESB and requests him to open a stateful conversation with an application server processing software application B (step 405). Main ESB selects an application server, referred to as B2, dedicated to process software application B. Main ESB enriches the DCX with affinity key corresponding to B2 (step 406) and forwards to that application server the request for affinity initialization (step 407). Thus, B2 is informed that the life duration of its part of user context must be linked to the life duration of the session (step 405). B2 allocates a portion of its data storage means to the part of the user context (step 408). B2 enriches the DCX with the Applicative Context Key and sends back the DCX to the main ESB (step 409). DCX is stored at the main ESB and is sent back to the collateral ESB (step 410).

Collateral ESB retrieves the original message, updates it with new DCX and targets application server B2 in accordance with the Affinity Key of the DCX (step 411). The transaction is thus routed to B2 (step 411). B2 then receives a request in an EDIFACT protocol and processes it. For instance, the request may consist in creating a passenger file.

As the life duration of the part of the user context of B2 is linked to the one of the session, the passenger file will be available at B2 during the entire time life of the session and will be deleted afterwards.

Figure 5:
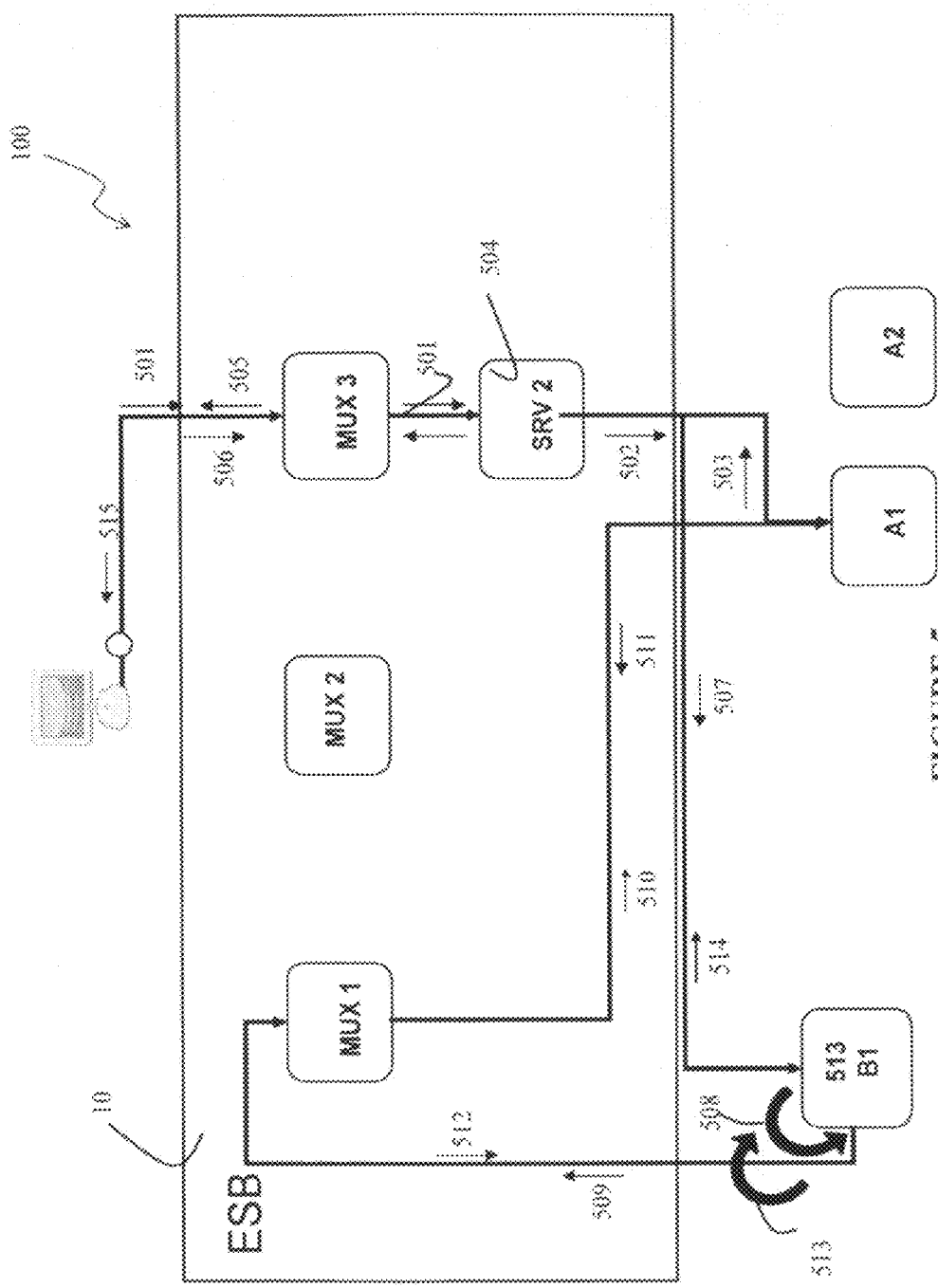
FIG. 5 is a simplified high level block diagram of some components of the system that illustrates an exemplary use case.

FIG. 5 depicts another use case of the invention. In this exemplary use case, ESB 10 comprises a plurality of multiplexer (MUX1, MUX2, MUX3) and at least a server (SRV2) in connection with multiplexer MUX3.

At step 501, a user sends a request to server SRV2. Server SRV2 creates a DCX record for that session.

As the session has just started, no context is available yet and the application server A1 processing software application A is called and receives the transaction along with the DCX. DCX is enriched which an Affinity Key for that application server A1. Affinity is then set for the software application A (step 502). A1 processes the transaction, stores its part of user context and enriches the DCX with it Applicative Context Key. For instance, user context relates to flight availabilities and A1 is in charge of retrieving references of available flights. DCX is then sent back (step 503) at main ESB 10 and stored (step 504). At step 505, the user is provided with results of the processing of A1 (references of flights that are available). This ends the first transactions for that session.

The user then initiates another transaction. For instance the user wants to purchase one segment of the flights that were retrieved through transaction 1.

SRV2 receives the purchase requests and determines that software application B must be called (step 506). An affinity is then created with an application server B1 of group of service B. DCX is sent to that application server B1 (step 507). An Applicative Context Key is also created for B1 (508). The DCX is then cascaded through multiplexer MUX1 in charge of handling all transactions coming from application servers processing software application B (step 509). MUX1 determines that software application A is called with a request of affinity. The DCX allows MUX1 to target A1 (step 510). Thanks to its Applicative Context Key, A1 retrieves its part of the context stored during the previous transaction (references of available flights). Then A1 sends back the transaction along with the DCX to MUX1 (step 511). The reply from A1 is return by ESB to B1 (step 512). B1 processes the transaction thanks to the data retrieve from A1. For instance, an available segment is priced. DCX is cascaded (step 513) and sent with the results of the processing to the main ESB (step 514). DCX is stored. Results of processing are provided to the user (step 515).

As detailed in the above description, the invention provides a solution to provide a consistent and unified view of a user context, keeping modularity of the system to ease the increase of processing capacity and allowing easy integration of new services/products.

The invention also provides significant advantages in term of operability as it allows an easier control of the resources allocated to each sub part of a global product comprising various software applications. It also enables to minimize the risk of global outage since an outage on a given machine or set of machines does not impact significantly the other machines.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent data structures and logic flows may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method of providing a user with a user session a distributed computing environment comprising a plurality of first application servers each having a first identity and a first software application, the method comprising:
   receiving a first request from a user at a first routing device as part of a user session;
   assigning at the first routing device a correlation record to the user session
   determining with a processor of the first routing device that the first software application is required to process a first transaction relating to the first request;
   selecting with the processor of the first routing device one of the first application servers to process the first transaction;
   enriching with the processor of the first routing device the correlation record with a first reference that designates the identity of the first application server selected to process the first transaction;

routing the first transaction and the correlation record from the first routing device to the first application server with the identity designated by the first reference; and processing the first transaction with the first software application at the first application server with the identity designated by the first reference.

2. The method of claim 1, further comprising:
storing the correlation record at the first routing device.

3. The method of claim 1 wherein processing the first transaction with the first software application at the first application server with the identity designated by the first reference further comprises:
generating user context when the first software server processes the first transaction using the first software application; and
storing the user context at the first application server with the identity designated by the first reference.

4. The method of claim 3 further comprising:
enriching the correlation record with a second reference that designates that the user context is stored at the first application server with the identity designated by the first reference; and
returning the correlation record containing the first reference and the second reference to the first routing device.

5. The method of claim 4 further comprising:
during the user session, receiving a second request from the user at the first routing device;
determining at the first routing device that the second request requires a second transaction using the first software application;
reading the first reference from the correlation record;
sending the second transaction and the correlation record from the first routing device to the first application server identified by the first reference; and
processing the second transaction with the first software application at the first application server identified by the first reference.

6. The method of claim 5 wherein processing the second transaction with the first software application at the first application server identified by the first reference further comprises:
reading the second reference from the correlation record at the first application server identified by the first reference; and
retrieving the user context based upon the second reference for use in processing the second transaction at the first application server identified by the first reference.

7. The method of claim 1 wherein the distributed computing environment further comprises a second plurality of application servers each having a second identity and a second software application executing on each of the second plurality of application servers, and further comprising:
during the user session, receiving a second transaction for the second software application from the first application server at a second routing device;
selecting with the second routing device one of the second application servers to process the second transaction;
enriching the correlation record with a second reference that designates the identity of the second application server selected to process the second transaction; and
returning the correlation record containing the first reference and the second reference from the second routing device to the first routing device.

8. The method of claim 7 further comprising:
routing the second transaction and the correlation record from the second routing device to the second application server identified by the second reference; and processing the second transaction with the second software application at the second application server.

9. The method of claim 1 wherein the distributed computing environment further comprises a plurality of second application servers each having a second identity and a second software application executing on each of the second plurality of application servers, and further comprising:
during the user session, receiving a second transaction for the second software application and the correlation record from the first application server identified by the first reference at a second routing device;
determining at the second routing device that the second transaction will generate user context; and
based upon the determining, calling the first routing device to select one of the second application servers to process the second transaction that will generate the user context.

10. The method of claim 9 further comprising:
selecting at the first routing device one of the second application servers to process the second transaction that will generate the user context;
enriching the correlation record at the first routing device with a second reference that designates the identity of the second application server selected to process the second transaction; and
communicating the correlation record with the second reference to the second routing device.

11. The method of claim 10 further comprising:
reading at the second routing device the second reference from the correlation record; and
routing the second transaction from the second routing device to the second application server identified by the second reference.

12. The method of claim 10 further comprising:
before routing the second transaction from the second routing device to the second application server identified by the second reference, sending a message from the first routing device to the second application server identified by the second reference to open a stateful conversation with the first routing device.

13. The method of claim 12 further comprising:
when the user session ends, closing the stateful conversation.

14. The method of claim 1 further comprising:
when the user session ends, deleting the correlation record at the first routing device.

15. A non-transitory computer-readable medium that contains software program instructions, where execution of the software program instructions by at least one data processor results in performance of operations that comprise execution of the method as in claim 1.

16. A distributed computing environment comprising:
a plurality of first application servers each having a first identity and a first software application; and
a first routing device comprising a processor configured to receive a first request from a user at as part of a user session, to assign a correlation record to the user session, to determine that the first software application is required to process a first transaction relating to the first request, to select one of the first application servers to process the first transaction, to enrich the correlation record with a first reference that designates the identity of the first application server selected to process the first transaction, and to route the first transaction and the correlation record from the first routing device to the first application server with the identity designated by the first reference, wherein the first application server with the identity designated by the first reference is configured to process the first transaction with the first software application.

17. The distributed computing environment of claim 16 wherein the first routing device further comprises storage coupled with the processor, the storage configured to store the correlation record.

18. The distributed computing environment of claim 17 wherein the first application server with the identity designated by the first reference is configured to store the user context, to enrich the correlation record with a second reference that designates that the user context is stored, and to return the correlation record containing the first reference and the second reference to the first routing device.

19. The distributed computing environment of claim 18 wherein the first routing device is further configured to receive a second request from the user during the user session, to determine that the second request requires a second transaction using the first software application, to read the first reference from the correlation record, and to send the second transaction and the correlation record from the first routing device to the first application server identified by the first reference,
wherein the first application server with the identity designated by the first reference is configured to process the second transaction with the first software application.

20. The distributed computing environment of claim 18 wherein the first application server with the identity designated by the first reference is configured to process the first transaction with the first software application by reading the second reference from the correlation record at the first application server identified by the first reference, and retrieving the user context based upon the second reference for use in processing the second transaction at the first application server identified by the first reference.

21. The distributed computing environment of claim 16 wherein the first application server with the identity designated by the first reference is configured to process the first transaction with the first software application by generating user context when the first software server processes the first transaction using the first software application, and storing the user context at the first application server with the identity designated by the first reference.

22. The distributed computing environment of claim 16 comprising:
a second plurality of application servers each having a second identity and a second software application executing on each of the second plurality of application servers; and
a second routing device configured to receive a second transaction for the second software application from the first application server, to select one of the second application servers to process the second transaction, to enrich the correlation record with a second reference that designates the identity of the second application server selected to process the second transaction, and to return the correlation record containing the first reference and the second reference from the second routing device to the first routing device.

23. The distributed computing environment of claim 22 wherein the second routing device is configured to route the second transaction and the correlation record to the second application server identified by the second reference,
wherein the second transaction is processed with the second software application at the second application server.

24. The distributed computing environment of claim 16 comprising:
a second plurality of application servers each having a second identity and a second software application executing on each of the second plurality of application servers; and
a second routing device configured to a second transaction for the second software application and the correlation record from the first application server identified by the first reference during the user session, to determine that the second transaction will generate user context, and to call the first routing device to select one of the second application servers to process the second transaction that will generate the user context.

25. The distributed computing environment of claim 24 wherein the first routing device is configured to select one of the second application servers to process the second transaction that will generate the user context, to enrich the correlation record with a second reference that designates the identity of the second application server selected to process the second transaction, and to communicate the correlation record with the second reference to the second routing device.

26. The distributed computing environment of claim 25 wherein the second routing device is configured to read the second reference from the correlation record and to route the second transaction from the second routing device to the second application server identified by the second reference.

27. The distributed computing environment of claim 25 wherein the first routing device is configured to send a message to the second application server identified by the second reference to open a stateful conversation with the first routing device.

28. The distributed computing environment of claim 27 wherein the first routing device is configured to close the stateful conversation when the user session ends.

29. The distributed computing environment of claim 16 wherein the first routing device is configured to delete the correlation record at the first routing device when the user session ends.

* * * * *

UNITED STATES PATENT AND TRADEMARK OFFICE
CERTIFICATE OF CORRECTION

| | |
|---|---|
| PATENT NO. | : 8,433,809 B2 |
| APPLICATION NO. | : 13/065312 |
| DATED | : April 30, 2013 |
| INVENTOR(S) | : Pierre Dor |

It is certified that error appears in the above-identified patent and that said Letters Patent is hereby corrected as shown below:

In the Claims:

At column 16, claim number 1, line number 50, after "session", insert --in-- and at line number 55, change "a user session" to --the user session-- and at line number 57, after "session", insert --;--

At column 18, claim number 16, line number 56, after the first occurrence of "user" delete "at".

Signed and Sealed this
Tenth Day of September, 2013

Teresa Stanek Rea
*Acting Director of the United States Patent and Trademark Office*